March 16, 1971 A. L. BARRY ET AL 3,570,112

RADIATION HARDENING OF INSULATED GATE FIELD
EFFECT TRANSISTORS
Filed Dec. 1, 1967

Inventors
Albert L. Barry
Donald F. Page
By Cushman, Darby & Cushman
Attorneys

United States Patent Office 3,570,112
Patented Mar. 16, 1971

3,570,112

RADIATION HARDENING OF INSULATED GATE FIELD EFFECT TRANSISTORS

Albert L. Barry and Donald F. Page, Ottawa, Ontario, Canada, assignors to Her Majesty the Queen in right of Canada, as represented by the Minister of National Defence Filed Dec. 1, 1967, Ser. No. 687,383
Int. Cl. B01j *17/00;* H01g *13/00*
U.S. Cl. 29—571 5 Claims

ABSTRACT OF THE DISCLOSURE

A metal-oxide-semiconductor field effect device is rendered less sensitive to ionizing radiation by subjecting the device to ionizing radiation at a positive gate bias several times larger than the normal operating bias voltage of the device, and then partially temperature annealing the device.

This invention relates to improvements in the manufacture of field effect transistors, and more particularly to the manufacture of metal-oxide-semiconductor field effect transistors.

The basic field-effect, or unipolar, transistor includes a body of semi-conductor material, arranged in use for the flow of a current between two contacts called respectively the source and the drain. Laterally of the current flow path of the device there is at least one, but usually two, p-n junctions which collectively form the control grid or gate. The basic principle of the device involves constriction of the current flowpath, resulting from space-charge widening of the p-n junctions resulting from application of a control voltage or signal to the gate. At a certain voltage, called the pinch-off voltage, the depletion layers meet and current flow becomes close to zero.

The MOS (metal-oxide-semiconductor) type of field-effect transistor is related to the basic field-effect transistor described above. For example, if the body is of silicon, the gate electrode is on an insulating layer, usually silicon dioxide. The application of bias to the gate produces either a conducting layer underneath the oxide, which corresponds to the conducting region in the usual field effect device, or an insulating region which leads to a decreased conductance between the source and the drain. The first mode of operation is called the "enhancement" mode and the second mode is called the "depletion" mode.

It is important that a transistor, whatever its type, shall have reasonably stable characteristics, an although known metal-oxide-semiconductor field effect transistors have unique properties which make them potentially very important in certain applications, designers of high reliability circuitry, for example, for space applications, have been reluctant to consider their use because of unstable direct current characteristics in high temperature and in ionizing radiation environments. Ionizing radiation includes charged particles, X-rays, and gamma-rays.

Although high temperature environments and ionizing radiation environments both produce a similar effect, namely a lateral shift of the $I_d-V_{gs}$ characteristic, where $I_d$ is the drain current and $V_{gs}$ is the voltage difference between the source and the gate, there is ample evidence that they act by entirely different mechanisms. Devices are now available which show a high degree of thermal stabiilty, but these known devices show little or no improvement is resistance to radiation. A number of devices have since been found which do not exhibit this inverse correlation.

An object of the present invention is the provision of an improved manner of manufacture of MOS field-effect transistors which will result in a transistor which is relatively stable in the presence of ionizing radiation.

By way of example, in an electrometer circuit using MOS field-effect transistors, a dose of a few hundred rads should cause negligible shift in calibration, and a few tens of thousands of rads should not cause circuit failure. These requirements cannot be met by any commercially available MOS transistors of which the applicants are aware, without the use of the elaborate precautions.

According to the present invention, a method of reducing the sensitivity to ionizing radiation of a MOS field-effect device including a substrate of semiconductor, an insulating film of metallic oxide and a gate electrode separated from the substrate by the metallic oxide, comprises subjecting the device to ionizing radiation at a positive gate bias several times larger than the normal operating bias voltage of the device, and then partially temperature annealing the device.

The invention will now be described, by way of example, with reference to the accompanying drawings, in which.

Figure 1:
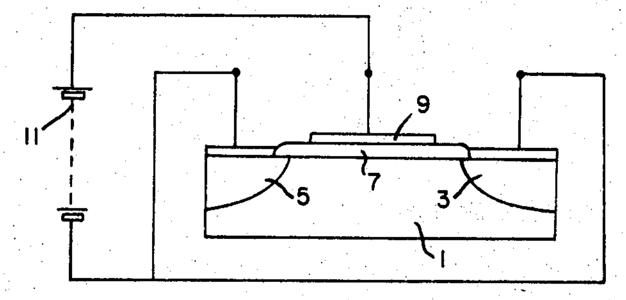
FIG. 1 is a diagrammatic drawing of a metal-oxide-semiconductor (MOS) field-effect transistor.

The transistor of FIG. 1 is formed from an elongated slice 1 of n-type conductivity silicon provided with a source contact 3 in the form of a diffused region of p-type conductivity adjacent one end and a drain contact 5 in the form of a diffused region of p-type conductivity at the opposite end. The slice is formed on one face with a layer 7 of silicon oxide, which serves as an insulator, and on which is deposited a metal layer 9 forming the gate electrode.

In order to produce radiation hardening of the transistor, it is connected up as shown so that battery 11 applies to the gate 9 a voltage of about +30 volts with respect to the source contact 3. Source contact 3 is strapped to the drain contact 5, so that over the whole oxide-semiconductor interface approximately the same potential difference is applied.

For the purposes of the present invention, it is convenient to use as a basis the "small-dose radiation sensitivity" of the transistor, which is defined as being the incremental shift of the gate threshold voltage with the application of an increment of radiation, i.e. $dV_T/d\phi$ and is quoted in millivolts per kilorad.

By using the hardening technique set out above, the radiation sensitivity can be made negligible for doses up to several thousand rads, at the expense of only minor changes in other device parameters.

It is suggested that the most probable explanation of why radiation shifts the $I_d-V_{gs}$ curve is that radiation produces a change in the number of surface states at the oxide-semiconductor interface, and/or the creation of additional space charge (of electronic rather than ionic nature) entirely within the oxide. It is probable that the latter predominates.

Consider the $SiO_2$ insulating layer of a MOS field-effect transistor with a positive voltage applied to the gate with respect to the substrate, the source and drain being tied to the latter. In a radiation environment, energy is dissipated throughout the oxide by ionizing processes, each rad of absorbed dose producing in the order of $10^{13}$ electron-hole pairs per cubic centimeter in silicon or $SiO_2$. Assuming these generated carriers have non-zero lifetimes and mobilities, they will drift under the influence of the large electric field in the oxide. These carriers may recombine, be extracted at the oxide boundaries, or become trapped in trapping centers within the oxide. It is now merely necessary that the two species (holes and electrons) be trapped in unequal numbers, with consequent extraction from the oxide in unequal numbers, in order to leave behind an unneutralized space charge which could account for the observed radiation effect.

It is observed in practice, from the direction of the shift in the $I_d-V_{gs}$ characteristic, that the trapped charge is positive in sign, indicating that the trapped species is holes. Radiation under both gate polarities tends to increase surface inversion of an n-type substrate, and to reduce surface inversion of a p-type substrate. A greater effect is found with positive gate irradiation.

After large doses of radiation at a particular gate bias, it appears that a charge distribution characteristic of that bias results, and that this is independent of previous radiation history.

It must be appreciated that the above description is not the sole explanation of radiation effects in a MOS field effect transistor. It does not explain, for example, the change in the shape of the transfer conductance curve which takes place under moderately large doses of radiation. That observation implies a gate voltage dependent quantity of excess positive charge which could better be explained by a radiation-induced change in the number and/or energy distribution of interface surface states. For radiation-induced shifts of a few volts, however, the change in shape of the $g_m$ curve is negligible, and the satisfactory manner in which the oxide space-charge model explains most observed effects suggests that the full story of radiation damage probably involves creation of excess positive charge both at the semi-conductor interface and within the oxide layer.

Figure 2:
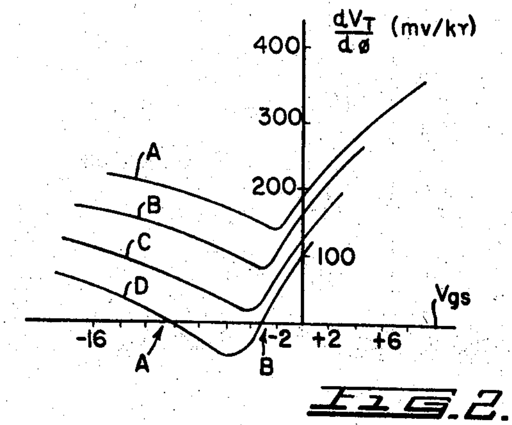
FIG. 2 is a graphical representation of characteristics of untreated and treated transistors.

The effect on "small-dose sensitivity" of successive doses of radiation at $V_r=+30$ volts is shown in FIG. 2. In that figure, radiation sensitivity in millivolts per kilorad (vertical axis) is plotted against gate voltage, curve A indicating the result of testing an unhardened transistor, and curves B, C and D indicating the results of testing such a transistor after respectively 3000 rads, 6000 rads and 9000 rads, in each case the gate being held at $+30$ volts relative to the source during irradiation. It will be seen that the radiation-induced shift can be made to reverse sign over a range of gate bias by sufficient irradiation at large positive bias, producing two intercepts at A and B respectively on the horizontal axis where small-dose radiation sensitivity is zero. While the intercept A can be shifted in the negative direction by further large-bias irradiation, the transistor transfer characteristics are also shifted in this direction. The question then arises whether the radiation sensitivity at a particular gate bias (corresponding to some chosen drain current bias) can be made to approach zero, and whether it will remain near zero under radiation at that bias.

Figure 3:
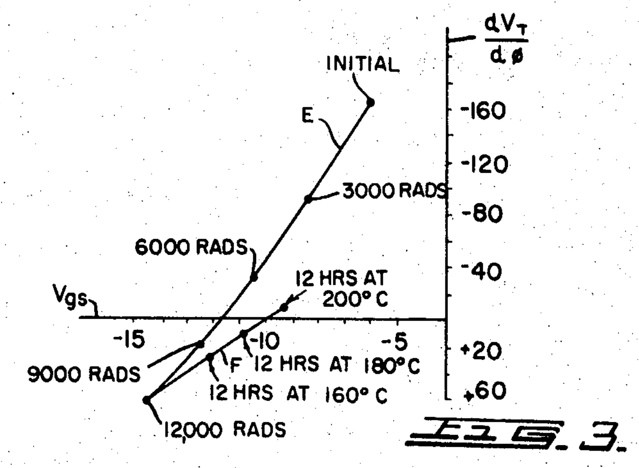
FIG. 3 shows the effect of successive doses of radiation on a transistor.

FIG. 3 shows the effect of successive doses of radiation on the locus of points on a plot E of $dV_T/\phi$ against $V_{gs}$ corresponding to a constant drain bias current of 100 microamps. It can be seen that the small-dose sensitivity at this bias current may easily be made zero, at the sacrifice of a larger threshold voltage. Further large-bias irradiation will reverse the sign of the small-dose sensitivity. FIG. 3 also shows the effect of temperature annealing at successively higher temperatures, curve F.

It is to be noted that the large change in radiation sensitivity after only a few thousand rads does not contradict the previous statement that $\Delta V_T$ is a linear function of $\Delta\phi$ up to doses of tens of thousands of rads. Here we are measuring $dV_T/d\phi$ at small negative gate voltages after successive doses of radiation carried out with a large positive bias on the gate. It will be seen that the change in gate voltage required to produce $I_d=100$ microamperes (which is nearly identical with $V_T$) is very nearly equal for successive doses of radiation at $V_r=+30$ volts.

It has been found that after sufficient radiation of a shift in the operating point does develop, but at a much lower rate than would be the case with an unhardened transistor. It has been found possible to make a typical transistor withstand radiation doses two orders of magnitude greater than the unhardened device, before a given arbitrary small change in bias point (say 2%) occurs. This represents a most valuable improvement in radiation hardness for such applications as a radiation monitoring electrometer circuit.

A typical FI–100 MOS field-effect transistor was tested in such a circuit, and after receiving 20,000 rads of $Co^{60}$ radiation required no adjustment of the zeroing control. An unhardened device required re-zeroing after only a few hundred rads.

The net effect of the complete hardening procedure, which consists of irradiation at a large positive gate bias followed by partial temperature annealing, is thus to reduce the small-dose radiation sensitivity at a particular bias point by two orders of magnitude or more.

The invention has been described above as applied to a field-effect transistor, but can be applied to other field-effect devices utilizing a gate electrode and liable to radiation damage. Thus the invention can be applied to a field-effect resistor and to a field-effect variable capacitor.

In the embodiment of the invention described above, the semiconducting material used for the device was silicon, but the principles of the invention can be applied to devices using other semiconducting materials, for example, germanium, cadmium sulphide (CdS) and cadmium selenide (CdSe).

The field-effect transistor shown is selected to show the basic form of a field-effect transistor, and those skilled in the art will appreciate that practical transistors tend to use other arrangements of the substrate, the drain and source electrodes, and the gate. The invention is equally applicable to such alternative forms of transistor.

The application of the invention to micro-circuits must depend upon the compatibility of the irradiation process with the other components of the micro-circuit. Subject to this proviso, the invention can be applied to integrated circuits, i.e., in which a single slice of semiconductor is provided with a pattern of semiconductor p-n junctions; to thin film circuits, in which suitable films are deposited on an insulating substrate of say glass; and to hybrid circuits in which the upper surface of a semiconductor slice is used as the substrate for a thin-film circuit, p-n junctions being provided as and where necessary on the substrate.

The substrate can be made of p-type, n-type or intrinsic semi-conductor material. The invention has been described, by way of example, as applied to devices using silicon dioxide insulated structures, and with these the irradiation should take place as described at a positive gate bias. However, the basic principle of the present invention is the subjection of the device to ionizing radiation while the device is subjected to a suitable gate bias several times larger than the normal operating bias voltage of the device, together with subsequent partial temperature annealing. In a device using materials other than silicon dioxide as the insulant, it is necessary to ascertain by experiment firstly the correct polarity of the gate bias to be used and secondly the optimum value for that gate bias. Such experiments are of the nature of routine tests and do not require further invention for their performance.

We claim:

1. A method of reducing the sensitivity to ionizing radiation of a MOS field-effect device of the type having a substrate of semiconductor material, an insulating film of metallic oxide provided on the substrate, and a gate electrode separated from the substrate by the metallic oxide film comprising the steps of:

maintaining the device substantially at room temperature while subjecting the device to ionizing radiation at a positive gate bias several times larger than the normal operating bias voltage for the device; and then raising the temperature of the device to effect partial temperature annealing of the device.

2. The method according to claim 1, in which the gate bias used during irradiation is about 30 volts.

3. The method according to claim 1, in which the irradiation applied to the device is between 9000 and 12,000 rads.

4. The method according to claim 1, in which source and drain terminals of the device are maintained at the same potential during irradiation.

5. A method of reducing the sensitivity to ionizing radiation of a MOS field-effect device of the type having a substrate of semiconductor, an insulating film of metallic oxide, and a gate electrode separated from the substrate by the metallic oxide comprising the steps of:

maintaining the device substantially at room temperature while subjecting the device to ionizing radiation at a positive gate bias several times larger than the normal operating bias voltage for the device; and then raising the temperature of the device to effect partial temperature annealing of the device.

References Cited

UNITED STATES PATENTS

| | | | |
|---|---|---|---|
| 3,328,210 | 6/1967 | McCaldin et al. | 29—576 |
| 3,386,163 | 6/1968 | Brennemann et al. | 29—571 |
| 3,388,009 | 6/1968 | King | 317—235 |
| 3,413,531 | 11/1968 | Leith | 317—235 |
| 3,449,824 | 6/1969 | Heilmeir et al. | 29—571 |

OTHER REFERENCES

IBM Technical Disclosure Bulletin, vol. 8, No. 4, September 1965, pp 638 and 639 "Electron Beam Control of FET Characteristics" by A. J. Speth.

JOHN F. CAMPBELL, Primary Examiner

W. TUPMAN, Assistant Examiner

U.S. Cl. X.R.

29—584, 585; 148—1.5; 250—42; 317—235